US009909281B2

(12) United States Patent
Nakagaki et al.

(10) Patent No.: US 9,909,281 B2
(45) Date of Patent: Mar. 6, 2018

(54) CONSTRUCTION MACHINE

(71) Applicant: YANMAR CO., LTD., Osaka-shi, Osaka (JP)

(72) Inventors: Mitsuhiro Nakagaki, Osaka (JP); Takayuki Shirouzu, Osaka (JP); Katashi Tanaka, Chikugo (JP)

(73) Assignee: YANMAR CO., LTD., Osaka (JP)

( * ) Notice: Subject to any disclaimer, the term of this patent is extended or adjusted under 35 U.S.C. 154(b) by 32 days.

(21) Appl. No.: 14/916,097

(22) PCT Filed: Aug. 28, 2014

(86) PCT No.: PCT/JP2014/072599
§ 371 (c)(1),
(2) Date: Mar. 2, 2016

(87) PCT Pub. No.: WO2015/033852
PCT Pub. Date: Mar. 12, 2015

(65) Prior Publication Data

US 2016/0215478 A1 Jul. 28, 2016

(30) Foreign Application Priority Data

Sep. 3, 2013 (JP) ................................ 2013-182371

(51) Int. Cl.
*E02F 9/20* (2006.01)
*F02D 29/04* (2006.01)
(Continued)

(52) U.S. Cl.
CPC ............ *E02F 9/2066* (2013.01); *E02F 3/325* (2013.01); *E02F 9/2235* (2013.01); (Continued)

(58) Field of Classification Search
CPC ................................ B60K 3/00; E02F 9/2066
See application file for complete search history.

(56) References Cited

U.S. PATENT DOCUMENTS 7,588,118 B2 * 9/2009 Sawada ................ E02F 9/2235 180/242
7,908,068 B2 * 3/2011 Kondou ................... E02F 9/20 701/50

(Continued)

FOREIGN PATENT DOCUMENTS

EP 1571339 A1 9/2005
EP 1947316 A1 7/2008

(Continued)

OTHER PUBLICATIONS

International Search Report corresponding to Application No. PCT/JP2014/072599; dated Nov. 25, 2014, with English translation.

(Continued)

*Primary Examiner* — Alex C Dunn
(74) *Attorney, Agent, or Firm* — Cantor Colburn LLP

(57) ABSTRACT

In a backhoe that is a construction machine in which a swash plate angle of a variable capacity hydraulic pump driven by an engine is controlled based on a difference between an actual engine speed of the engine and a target engine speed calculated from an accelerator position, the engine is controlled through isochronous control when the actual engine speed of the engine is equal to or higher than a maximum torque engine speed with which a maximum torque of the engine is able to be output, and the engine is controlled through droop control when the actual engine speed of the engine is lower than the maximum torque engine speed with which the maximum torque of the engine is able to be output.

4 Claims, 8 Drawing Sheets

(51) Int. Cl.

| | |
|---|---|
| ***E02F 3/32*** | (2006.01) |
| ***E02F 9/22*** | (2006.01) |
| ***F15B 11/16*** | (2006.01) |
| *F02D 29/00* | (2006.01) |

(52) U.S. Cl.

CPC .......... *E02F 9/2285* (2013.01); *E02F 9/2296* (2013.01); *F02D 29/04* (2013.01); *F15B 11/165* (2013.01); *F02D 29/00* (2013.01); *F15B 2211/20523* (2013.01); *F15B 2211/20546* (2013.01); *F15B 2211/6651* (2013.01)

(56) References Cited

U.S. PATENT DOCUMENTS

| | | | | |
|---|---|---|---|---|
| 8,484,969 | B2 * | 7/2013 | Shiomi | F02D 31/003 123/352 |
| 9,062,619 | B2 * | 6/2015 | Murakami | F02D 31/001 |
| 2006/0229786 | A1 * | 10/2006 | Sawada | E02F 9/2235 701/50 |
| 2009/0101107 | A1 * | 4/2009 | Kondou | E02F 9/20 123/349 |
| 2011/0203556 | A1 * | 8/2011 | Shiomi | F02D 31/003 123/559.1 |
| 2013/0173123 | A1 * | 7/2013 | Oouchida | B60W 10/06 701/50 |

FOREIGN PATENT DOCUMENTS

| | | | |
|---|---|---|---|
| JP | H1088621 | A | 4/1998 |
| JP | 2003083113 | A | 3/2003 |
| JP | 2005009431 | A | 1/2005 |
| JP | 2007255414 | A | 10/2007 |
| JP | 2011196116 | A | 10/2011 |
| JP | 2011196227 | A | 10/2011 |
| KR | 1020060010782 | A | 2/2006 |

OTHER PUBLICATIONS

Extended European Search Report corresponding to Application No. 14842412.0-1712/3043050; PCT/JP2014072599; dated Apr. 18, 2017.

KIPO Notification of Reason for Refusal corresponding to KR Application No. 1020167008133; dated May 1, 2017.

* cited by examiner

CONSTRUCTION MACHINE

CROSS REFERENCE TO RELATED APPLICATIONS

This is the U.S. national stage of application No. PCT/JP2014/072599, filed on Aug. 28, 2014. Priority under 35 U.S.C. § 119(a) and 35 U.S.C. § 365(b) is claimed from Japanese Application No. 2013-182371, filed Sep. 3, 2013, the disclosure of which is also incorporated herein by reference.

TECHNICAL FIELD

The present invention relates to a construction machine.

BACKGROUND ART

Conventionally, construction machines used in highlands with low atmospheric pressure suffer frequent engine stalls. This is because an engine output decreases as an air intake amount decreases, and as a result, an output torque of the engine is overwhelmed by an absorption torque of a hydraulic pump. Thus, a known construction machine controls a discharge amount (swash plate angle) of the hydraulic pump to reduce the absorption torque. The construction machine controls the swash plate angle of the hydraulic pump in such a manner that the actual engine speed and the target engine speed of the engine match to prevent the engine from stalling as described in Patent Literature 1 for example.

Droop control is performed for the engine of the construction machine described in Patent Literature 1, so that engine speed hunting of the engine due to abrupt fluctuation of the engine speed of the engine is prevented when the swash plate angle of the hydraulic pump is being controlled. More specifically, in the construction machine, the droop control is performed so that a required shaft torque is output with the engine speed of the engine controlled based on a predetermined change amount. Thus, in the construction machine, the engine speed of the engine is controlled so that the required shaft torque is output when a load changes while the construction machine is travelling. All things considered, there has been a problem in that a travelling speed of the construction machine can change in accordance with a road surface condition.

CITATION LIST

Patent Literature

PTL 1: Japanese Unexamined Patent Application Publication No. 2011-196116

SUMMARY OF INVENTION

Technical Problem

An object of the present invention is to provide a construction machine that selects a mode for controlling an engine in accordance with a task, and can prevent an engine speed hunting of the engine by controlling a discharge amount of a hydraulic pump.

Solution to Problem

The problem to be solved by the present invention is as described above, and means for solving the problems will be described below.

According to the present invention, in a construction machine in which a swash plate angle of a variable capacity hydraulic pump driven by an engine is controlled based on a difference between an actual engine speed of the engine and a target engine speed calculated from an accelerator position, the engine is controlled through isochronous control when the target engine speed calculated from an accelerator position is equal to or higher than a maximum torque engine speed with which a maximum torque of the engine is able to be output, and the engine is controlled through droop control when the target engine speed calculated from an accelerator position is lower than the maximum torque engine speed with which the maximum torque of the engine is able to be output.

According to the present invention, a control target engine speed at which control for the swash plate angle of the hydraulic pump starts when the engine is controlled through the isochronous control and a control target engine speed at which control for the swash plate angle of the hydraulic pump starts when the engine is controlled through the droop control are set to be different values.

According to the present invention, the engine is controlled through the isochronous control when the actual engine speed of the engine reaches a low idle engine speed of the engine.

Advantageous Effects of Invention

The present invention provides the following advantageous effects.

According to the present invention, in an engine speed region that is lower than the engine speed of the engine at which the maximum torque is output, the actual engine speed of the engine is gently reduced based on a droop characteristic when the absorption torque of the hydraulic pump increases. When the absorption torque of the hydraulic pump decreases through the control for the swash plate angle of the hydraulic pump, the actual engine speed of the engine is gently increased based on the droop characteristic. This can prevent hunting of the engine speed of the engine caused by an interference between the control for the engine and the control for the swash plate angle of the hydraulic pump.

According to the present invention, the discharge amount of the hydraulic pump is controlled in accordance with the mode for controlling the engine. This can prevent hunting of the engine speed of the engine caused by an interference between the control for the engine and the control for the swash plate angle of the hydraulic pump.

According to the present invention, reduction in the actual engine speed of the engine is prevented when the absorption torque of the hydraulic pump increases. This can prevent hunting of the engine speed of the engine caused by an interference between the control for the engine and the control for the swash plate angle of the hydraulic pump, while a stall of the engine can be prevented.

DESCRIPTION OF EMBODIMENTS

First of all, a backhoe 1 that is one embodiment of a construction machine according to the present invention is described with reference to FIGS. 1 to 3. The description is given below with front and rear, left and right, and upper and lower directions defined with a direction of an arrow F representing a front direction of the backhoe 1, and a direction of an arrow U representing an upward direction of the backhoe 1. It is to be noted that the construction machine is not limited to the backhoe 1 that is described as one embodiment of the construction machine in the embodiment.

Figure 1:
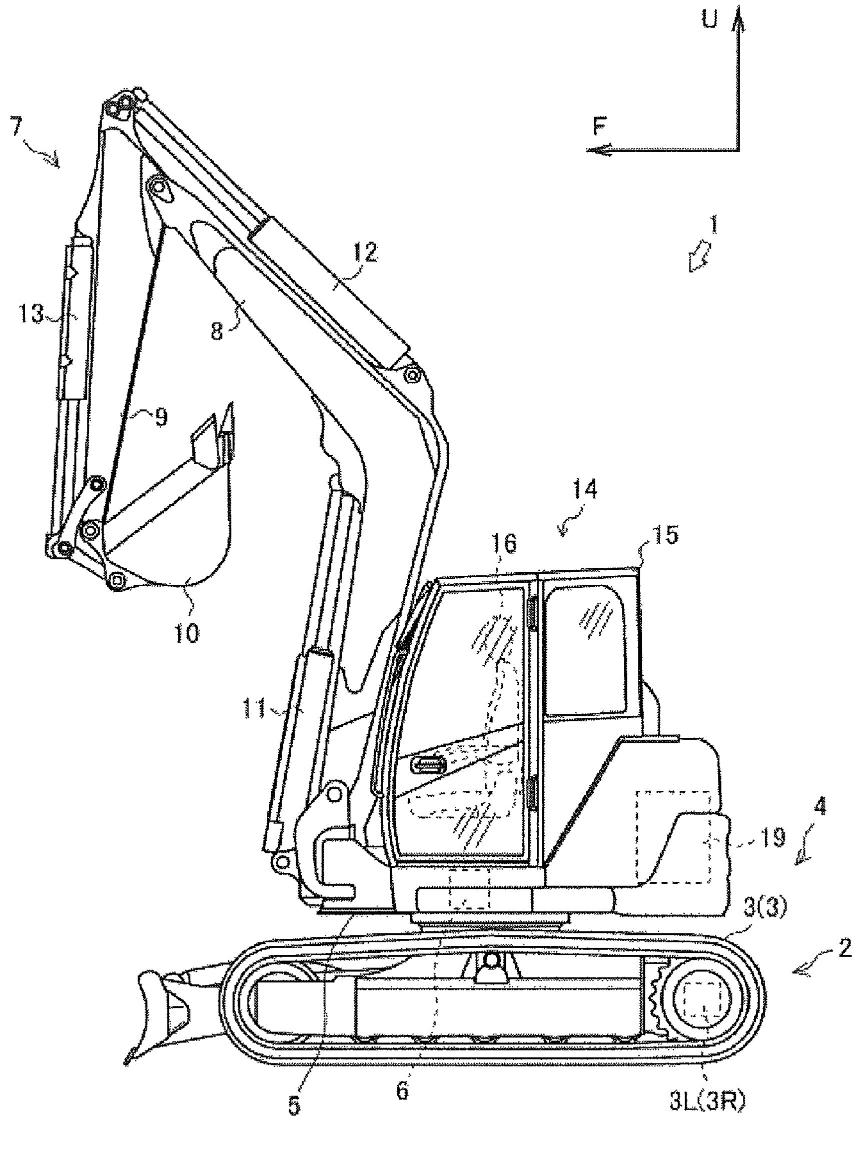
FIG. 1 is a right side view illustrating an overall configuration of a construction machine according to one embodiment of the present invention.

As illustrated in FIG. 1, the backhoe 1 mainly includes a travelling device 2, a swiveling device 4, and a working device 7.

The travelling device 2 mainly includes a pair of left and right crawlers 3 and 3, a left travel hydraulic motor 3L, and a right travel hydraulic motor 3R. The backhoe 1 can travel forward and rearward and can make a turn by the travelling device 2 with the left and the right travel hydraulic motors 3L and 3R respectively driving the crawlers 3 and 3 on the left and the right sides of the vehicle.

The swiveling device 4 mainly includes a swiveling base 5, a swiveling motor 6, an operation section 14, an engine 19, and the like. The swiveling base 5 serves as a main structure of the swiveling device 4. The swiveling base 5 is disposed on an upper side of the travelling device 2, and is swivelably supported by the travelling device 2. The swiveling base 5 can swivel relative to the travelling device 2 when the swiveling motor 6 is driven in the swiveling device 4. The working device 7, the operation section 14, the engine 19 serving as a power source, an engine control unit (ECU) 22, and a hydraulic circuit 23 (see FIG. 2) are disposed on the swiveling base 5. An atmospheric pressure sensor 21 (see FIG. 2) that can detect atmospheric pressure P is also disposed on the swiveling base 5.

The working device 7 mainly includes a boom 8, an arm 9, a bucket 10 that is one type of attachment, a boom cylinder 11, an arm cylinder 12, and an attachment cylinder 13.

The boom 8 has one end portion rotatably supported by a substantially center section in a front end portion of the swiveling base 5. The boom 8 pivots about the one end portion as the boom cylinder 11 is driven to extend and contract.

The arm 9 has one end portion rotatably supported by the other end portion of the boom 8. The arm 9 pivots about the one end portion as the arm cylinder 12 is driven to extend and contract.

The bucket 10 that is one type of attachment has one end portion rotatably supported by the other end portion of the arm 9. The bucket 10 pivots about the one end portion as the attachment cylinder 13 is driven to extend and contract.

As described above, the working device 7 has a multi-joint structure for digging in the ground and the like with the bucket 10 or performing other like operations. The working device 7 includes unillustrated hydraulic pipes for supplying hydraulic oil to the boom cylinder 11, the arm cylinder 12, and the attachment cylinder 13. The backhoe 1 according to the present embodiment is not limited to the working device 7 that includes the bucket 10 and performs the digging operation. For example, the working device 7 may include a hydraulic breaker instead of the bucket 10 and perform a smashing operation.

The operation section 14 may include various operation tools, and can be used for operating the backhoe 1. The operation section 14 is disposed at a front left side portion of the swiveling base 5. The operation section 14 includes an operator's seat 16 disposed at a substantially center portion in a cabin 15 and an operation lever device 17 (see FIG. 2) on both left and right sides of the operator's seat 16. The operation lever device 17 can be used for operating the working device 7 and the swiveling base 5.

The operation section 14 includes an accelerator 18 (see FIG. 2) used for changing a throttle position Sn for the engine 19. An operator can change an output (engine speed of the engine 19) of the engine 19 by operating the accelerator 18.

The engine 19 supplies power to the travelling device 2, the swiveling device 4, and the working device 7. More specifically, as illustrated in FIG. 2, the engine 19 drives a hydraulic pump 29 and a pilot hydraulic pump 30 that are described later and supply hydraulic oil to hydraulic devices of the travelling device 2, the swiveling device 4, and the working device 7. The engine 19 is controlled by the ECU 22.

The engine 19 is provided with an engine speed detection sensor 20 that detects an actual engine speed N of the engine 19. The engine speed detection sensor 20 includes a rotary encoder and is provided to an output shaft of the engine 19. The engine speed detection sensor 20 is not limited to that including the rotary encoder as in the present embodiment, and may have any configuration as long as the actual engine speed N can be detected.

Next, the ECU 22 of the backhoe 1 is described with reference to FIG. 2.

The ECU 22 controls the engine 19 and the like. The ECU 22 may have a physical configuration including a CPU, a ROM, a RAM, an HDD, and the like connected to each other through a bus, or may have a physical configuration including a one-chip LSI and the like. The ECU 22 may be integrally formed with a control device 36 described later. The ECU 22 stores various programs for controlling the engine 19 and the like.

The programs, related to control characteristics of the engine 19, stored in the ECU 22 include a program related to a droop characteristic for changing the engine speed of the engine 19 in accordance with a load increase or decrease and a program related to an isochronous characteristic with which the engine speed of the engine 19 is kept constant regardless of the load increase or decrease. The ECU 22 further stores an output torque characteristic map M1 with which an output torque characteristic Tp of the engine 19 is calculated based on the atmospheric pressure P, so that an emission regulation value can be accomplished. In the present embodiment, the output torque characteristic Tp indicates an acceptable output range of the engine speeds of the engine (hereinafter, simply referred to as "engine speed") with which the engine 19 satisfies the emission regulation value under the atmospheric pressure P, and thus indicates a maximum output torque of each engine speed.

The ECU 22 further stores a control characteristic map M2 with which one of control for the engine 19 based on the droop characteristic (hereinafter, simply referred to as "droop control") and control for the engine 19 based on the isochronous characteristic (hereinafter, simply referred to as "isochronous control") is selected with a target engine speed Nt (the engine speed to be maintained by the engine 19 in accordance with the accelerator position Sn) used as an index, in accordance with the calculated output torque characteristic Tp.

The ECU 22 is connected to various sensors and a fuel injection device that are unillustrated components of the engine 19, and can control an injection amount of fuel injected by the fuel injection device, for example.

The ECU 22 is connected to the engine speed detection sensor 20 and can acquire the actual engine speed N of the engine 19 detected by the engine speed detection sensor 20.

The ECU 22 is connected to the atmospheric pressure sensor 21 and can acquire the atmospheric pressure P detected by the atmospheric pressure sensor 21.

The ECU 22 can calculate the output torque characteristic Tp of the engine 19 from the output torque characteristic map M1 based on the atmospheric pressure P thus acquired.

The ECU 22 is connected to the control device 36 described later, and can acquire the target engine speed Nt calculated by the control device 36 based on the accelerator position Sn of the accelerator 18.

The ECU 22 can select one of the isochronous control and the droop control to be the control characteristic employed for the engine 19 from the control characteristic map M2 based on the acquired target engine speed Nt and the calculated output torque characteristic Tp.

More specifically, the ECU 22 selects the isochronous control when the output torque characteristic Tp of the engine 19, set in accordance with the atmospheric pressure P, indicates that the target engine speed Nt is equal to or higher than a maximum torque engine speed Np with which the maximum torque is output. On the other hand, the ECU 22 selects the droop control when the output torque characteristic Tp indicates that the target engine speed Nt is lower than the maximum torque engine speed Np.

Next, the hydraulic circuit 23 of the backhoe 1 is described with reference to FIGS. 2 and 3.

Figure 2:
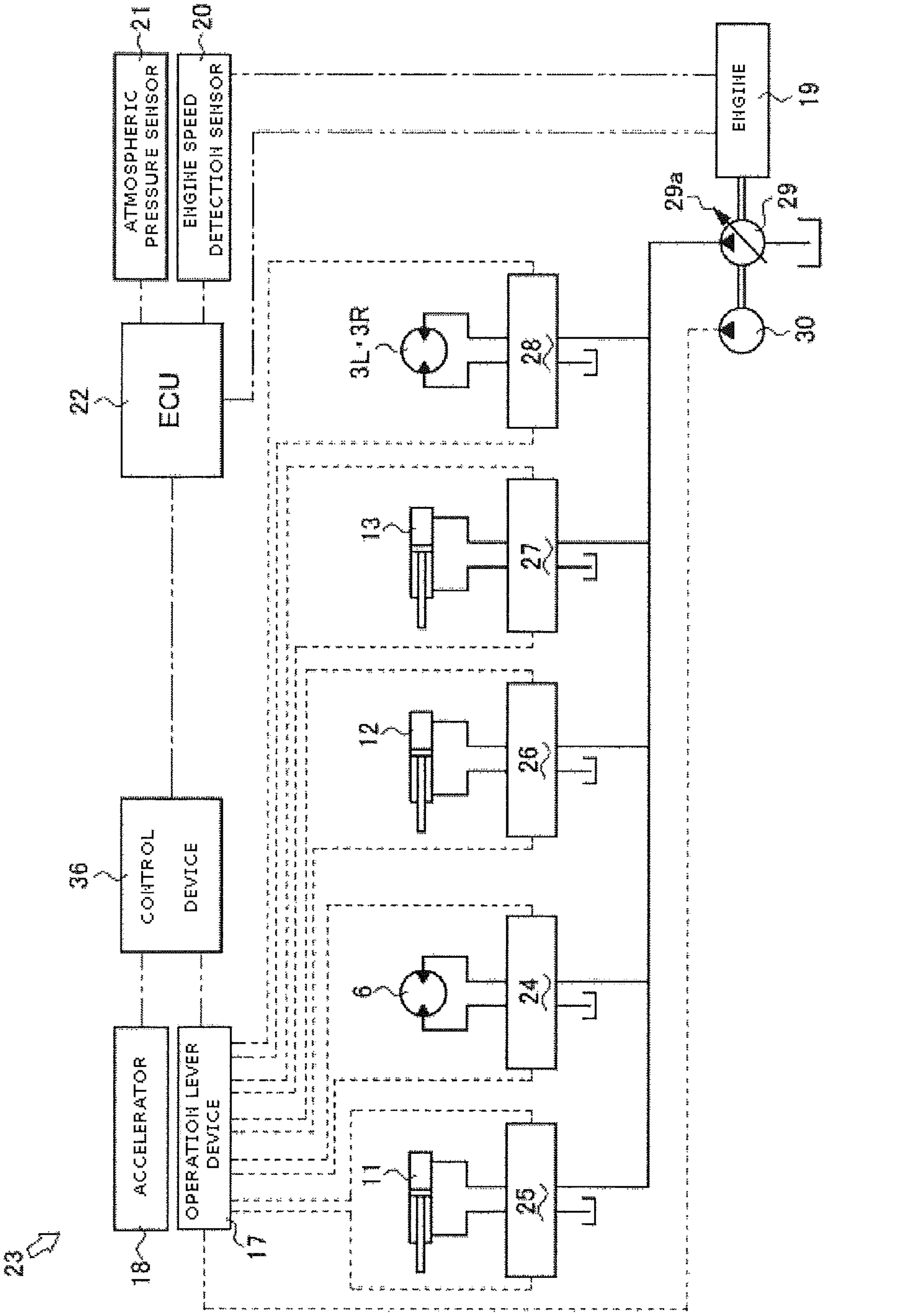
FIG. 2 is a diagram illustrating a configuration of a hydraulic circuit of the construction machine according to one embodiment of the present invention.
Figure 3:
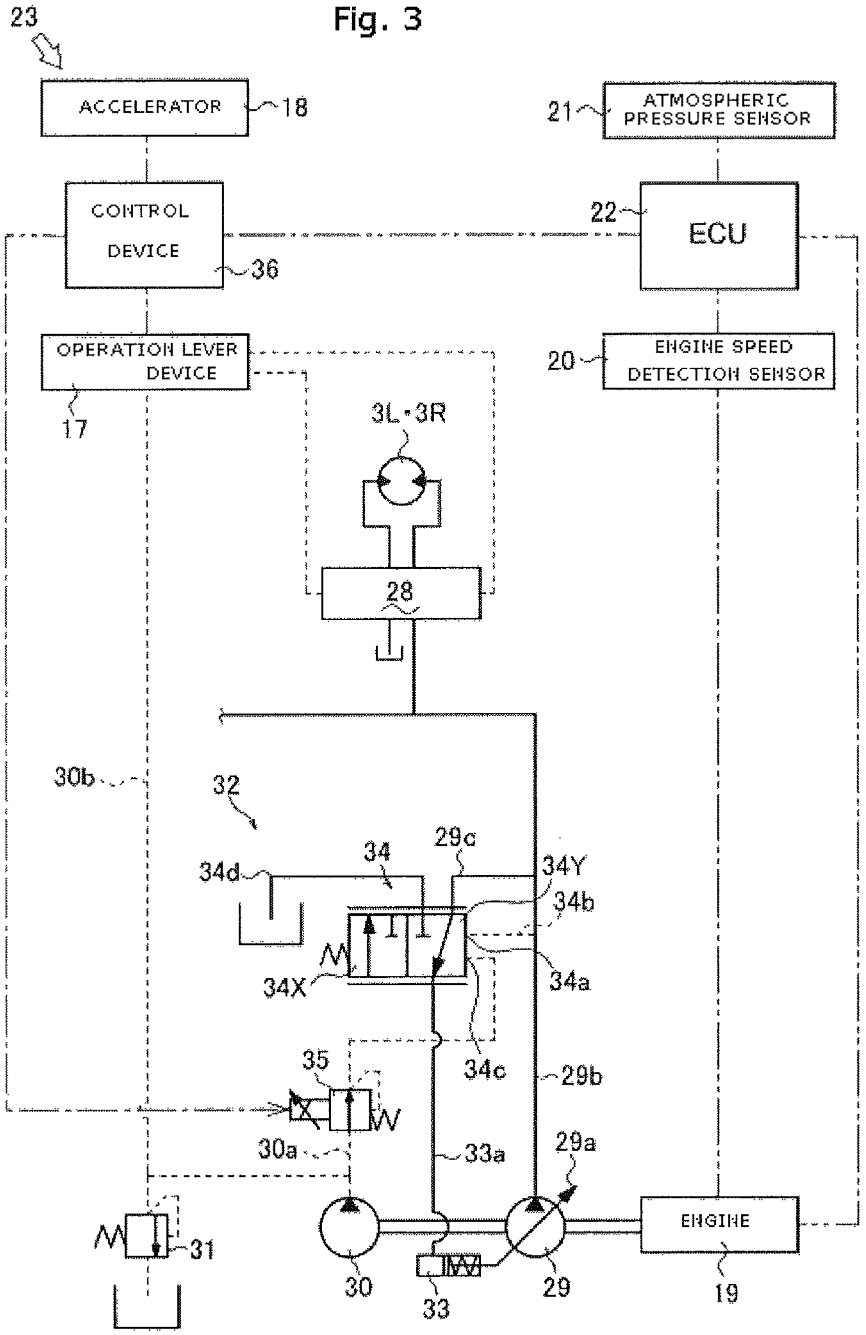
FIG. 3 is a diagram illustrating a configuration of a flowrate adjustment device in the hydraulic circuit of the construction machine according to one embodiment of the present invention.

As illustrated in FIG. 2, the hydraulic circuit 23 includes a swiveling motor directional control valve 24, a boom cylinder directional control valve 25, an arm cylinder directional control valve 26, an attachment directional control valve 27, a travel motor directional control valve 28, the hydraulic pump 29, the pilot hydraulic pump 30, the control device 36, and a flowrate adjustment device 32 (see FIG. 3).

The swiveling motor directional control valve 24, the boom cylinder directional control valve 25, the arm cylinder directional control valve 26, and the attachment directional control valve 27 are pilot-operated directional control valves with which a flow of the hydraulic oil supplied to the swiveling motor 6, the boom cylinder 11, the arm cylinder 12, and the attachment cylinder 13 is switched through a sliding movement of a spool caused by pilot hydraulic pressure.

The swiveling motor directional control valve 24 switches a direction of the hydraulic oil supplied to the swiveling motor 6. When the swiveling motor directional control valve 24 is at one position, the swiveling motor 6 is drivingly rotated in one direction by the hydraulic oil. When the swiveling motor directional control valve 24 is at the other position, the swiveling motor 6 is drivingly rotated in the other direction by the hydraulic oil.

The boom cylinder directional control valve 25 switches a direction of the hydraulic oil supplied to the boom cylinder 11. The boom cylinder 11 extends and contracts due to an effect of the boom cylinder directional control valve 25, whereby the boom 10 pivots upwardly or downwardly.

The arm cylinder directional control valve 26 switches a direction of the hydraulic oil supplied to the arm cylinder 12. The arm cylinder 12 extends and contracts due to an effect of the arm cylinder directional control valve 26, whereby the arm 9 pivots toward an arm crowding side or an arm dumping side.

The attachment directional control valve 27 switches a direction of the hydraulic oil supplied to the attachment cylinder 13. The attachment cylinder 13 extends and contracts due to an effect of the attachment directional control valve 27, whereby the bucket 10 pivots toward the arm crowding side or the arm dumping side.

The travel motor directional control valve 28 switches a direction of the hydraulic oil supplied to the left travel hydraulic motor 3L and the right travel hydraulic motor 3R (hereinafter, simply referred to as "travel motors 3L and 3R"). When the travel motor directional control valve 28 is at one position, the travel motors 3L and 3R are drivingly rotated in one direction by the hydraulic oil. When the travel motor directional control valve 28 is at the other position, the travel motors 3L and 3R are drivingly rotated in the other direction by the hydraulic oil.

The swiveling motor directional control valve 24, the boom cylinder directional control valve 25, the arm cylinder directional control valve 26, the attachment directional control valve 27, and the travel motor directional control valve 28 are configured to be capable of switching the direction of the hydraulic oil supplied to the directional control valves with the pilot hydraulic pressure based on an operation of the operation lever device 17.

The hydraulic pump 29 is driven by the engine 19 and discharges the hydraulic oil. The hydraulic pump 29 is a variable capacity pump the discharge amount of which can be changed by changing a swash plate angle of a movable swash plate 29*a*. The hydraulic oil discharged from the hydraulic pump 29 is supplied to the directional control valves.

The pilot hydraulic pump 30 is driven by the engine 19, and discharges the hydraulic oil, so that the pilot hydraulic pressure will be generated in oil paths 30*a* and 30*b* (see FIG. 3). The oil path 30*a* is connected to a second pilot port 34*c* of a pressure servo valve 34 via an electromagnetic proportional pressure reducing valve 35. The pilot hydraulic pressure in the oil path 30*a* and the oil path 30*b* is maintained at predetermined pressure by a relief valve 31.

As illustrated in FIG. 3, the flowrate adjustment device 32 adjusts the discharge amount of the hydraulic pump 29. The flowrate adjustment device 32 mainly includes a flowrate control actuator 33, a pressure servo valve 34, and the electromagnetic proportional pressure reducing valve 35.

The flowrate control actuator 33 is coupled to the movable swash plate 29*a* of the hydraulic pump 29, and changes the swash plate angle of the movable swash plate 29*a* to control the discharge amount of the hydraulic pump 29. A bottom chamber of the flowrate control actuator 33 is connected to the pressure servo valve 34 via the oil path 33*a*.

The pressure servo valve 34 changes the flowrate of the hydraulic oil supplied to the flowrate control actuator 33. The pressure servo valve 34 is connected to an oil path 29*b* via an oil path 29*c*. A first pilot port 34*a* of the pressure servo valve 34 is connected to the oil path 29*b* through an oil path 34*b*. The second pilot port 34*c* of the pressure servo valve 34 is connected to the pilot hydraulic pump 30 via the oil path 30*a* and the electromagnetic proportional pressure reducing valve 35. The pressure servo valve 34 can be switched to a position 34X or to a position 34Y through the sliding movement of the spool.

When the pressure servo valve 34 is at the position 34X, the discharge pressure of the hydraulic pump 29 is not applied to the bottom chamber of the flowrate control actuator 33, and thus the hydraulic oil in the bottom chamber returns to a hydraulic oil tank via the oil path 33*a*, the pressure servo valve 34, and an oil path 34*d*. As a result, the flowrate control actuator 33 changes the angle of the movable swash plate 29*a* of the hydraulic pump 29 in such a manner that the discharge amount of the hydraulic pump 29 increases.

When the pressure servo valve 34 is at the position 34Y, the discharge pressure of the hydraulic pump 29 is applied to the bottom chamber of the flowrate control actuator 33. As a result, the flowrate control actuator 33 changes the angle of the movable swash plate 29*a* of the hydraulic pump 29 in such a manner that the discharge amount of the hydraulic pump 29 decreases.

The electromagnetic proportional pressure reducing valve 35 reduces the pilot hydraulic pressure applied to the pressure servo valve 34. The electromagnetic proportional pressure reducing valve 35 is disposed at an intermediate portion of the oil path 30*a*. The electromagnetic proportional pressure reducing valve 35 is configured to be capable of switching the position of the pressure servo valve 34 to the position 34X by reducing the pilot hydraulic pressure applied to the second pilot port 34*c* of the pressure servo valve 34.

The control device 36 controls the discharge amount of the hydraulic pump 29 with the flowrate adjustment device 32. The control device 36 stores various programs for controlling the electromagnetic proportional pressure reducing valve 35 based on a target engine speed map M3 for calculating the target engine speed Nt based on the accelerator position Sn, a control target engine speed map M4 for calculating a control target engine speed Nc serving as a reference for controlling the electromagnetic proportional pressure reducing valve 35 based on the calculated target engine speed Nt, and a difference ΔN between the actual engine speed N and the control target engine speed Nc. The target engine speed Nt is an engine speed to be maintained by the engine 19 in accordance with the accelerator position Sn. The control target engine speed Nc is an engine speed serving as a reference for starting the control of changing the discharge amount of the hydraulic pump 29.

The control device 36 may have a physical configuration including a CPU, a ROM, a RAM, an HDD, and the like connected to each other through a bus, or including a one-chip LSI and the like.

The control device 36 is connected to the operation lever device 17 and can acquire an operation signal from the operation lever device 17.

The control device 36 is connected to the accelerator 18 and can acquire an operation signal from the accelerator 18 indicating the accelerator position Sn of the engine 19.

The control device 36 is connected to the electromagnetic proportional pressure reducing valve 35 and can transmit a control signal to the electromagnetic proportional pressure reducing valve 35.

The control device 36 is connected to the ECU 22 and can acquire the actual engine speed N of the engine 19 acquired by the ECU 22 from the engine speed detection sensor 20 described later and the output torque characteristic Tp calculated by the ECU 22.

The control device 36 can calculate the target engine speed Nt of the engine 19 from the target engine speed map M3 based on the acquired accelerator position Sn.

The control device 36 can calculate the control target engine speed Nc from the control target engine speed map M4 based on the calculated target engine speed Nt.

More specifically, the control device 36 calculates different control target engine speeds Nc based on the target engine speeds Nt of the engine 19. The control target engine speed Nc calculated by the control device 36 is larger in a case where the target engine speed Nt is equal to or higher than the maximum torque engine speed Np than in a case where the target engine speed Nt is lower than the maximum torque engine speed Np (so that a small difference between the target engine speed Nt and the control target engine speed Nc is achieved). In other words, the control target engine speed Nc calculated by the control device 36 is larger in a case where the isochronous control is performed by the engine 19 than in a case where the droop control is performed.

Modes for controlling the engine 19 and the hydraulic pump 29 of the backhoe 1 having the configuration described above are described below.

The control device 36 calculates the target engine speed Nt from the target engine speed map M3 based on the accelerator position Sn acquired from the control device 36.

The ECU 22 calculates the output torque characteristic Tp of the engine 19 from the output torque characteristic map M1. The ECU 22 selects any one of the droop control and the isochronous control as the control characteristic employed for the engine 19 from the control characteristic map M2 based on the target engine speed Nt, in accordance with the calculated output torque characteristic Tp.

The control device 36 calculates the control target engine speed Nc from the control target engine speed map M4 based on the calculated target engine speed Nt. Then, the control device 36 calculates the difference ΔN (=Nc−N) from the actual engine speed N of the engine 19 acquired from the ECU 22 and the calculated control target engine speed Nc, and determines whether the difference ΔN is equal to or larger than 0.

When the difference ΔN is larger than 0, the control device 36 performs control in such a manner that the pressure servo valve 34 is switched to the position 34Y with the electromagnetic proportional pressure reducing valve 35. As a result, the flowrate control actuator 33 changes the angle of the movable swash plate 29*a* of the hydraulic pump 29 in such a manner that the discharge amount (absorption torque) of the hydraulic pump 29 decreases. When the difference ΔN is smaller than 0, the control device 36 performs control in such a manner that the pressure servo valve 34 is switched to the position 34X with the electromagnetic proportional pressure reducing valve 35. As a result, the flowrate control actuator 33 changes the angle of the movable swash plate 29*a* of the hydraulic pump 29 in such a manner that the discharge amount (absorption torque) of the hydraulic pump 29 increases.

Figure 4:
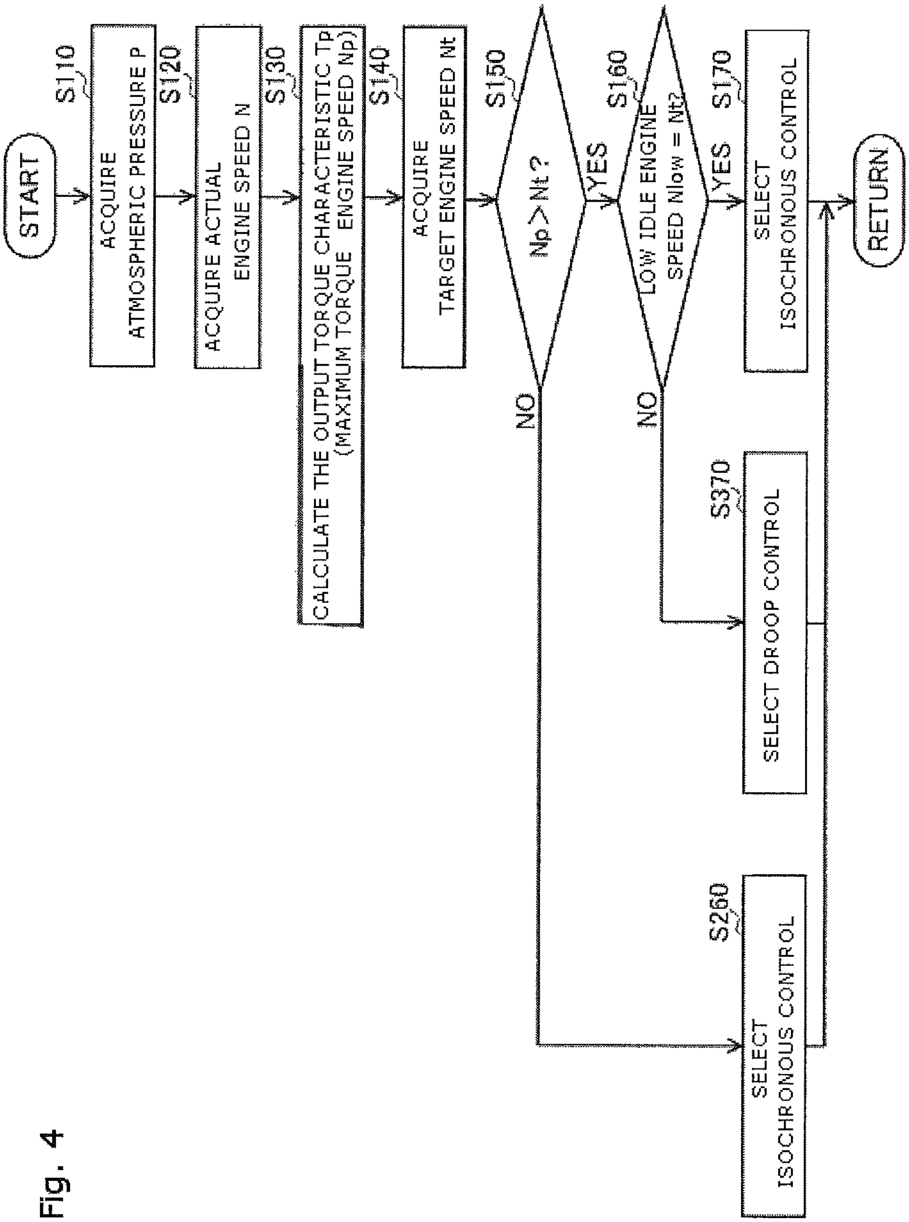
FIG. 4 is a flowchart illustrating a mode for controlling an engine of the construction machine according to one embodiment of the present invention.
Figure 5:
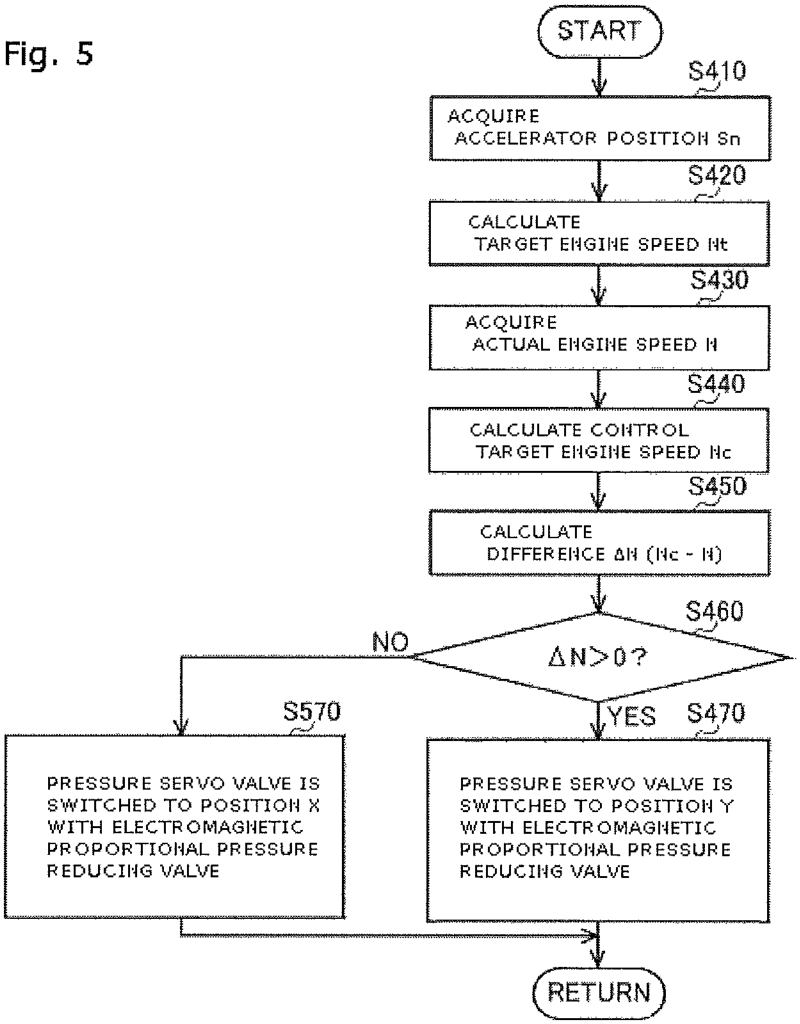
FIG. 5 is a flowchart illustrating a mode for controlling a hydraulic pump of the construction machine according to one embodiment of the present invention.

Modes for controlling the engine 19 and the hydraulic pump 29 by the ECU 22 and the control device 36 are described below in detail with reference to FIGS. 4 to 7. For convenience of explanation, the mode for controlling the engine by the ECU 22 illustrated in FIG. 4 is first described and then the mode for controlling the hydraulic pump 29 by the control device 36 illustrated in FIG. 5 is described. However, this does not mean that which mode for controlling is prioritized. The ECU 22 and the control device 36 work together to control the engine 19 and the hydraulic pump 29.

As illustrated in FIG. 4, in step S110, the ECU 22 acquires the atmospheric pressure P detected by the atmospheric pressure sensor 21 and proceeds to step S120.

In step S120, the ECU 22 acquires the actual engine speed N of the engine 19 from the engine speed detection sensor 20 and proceeds to step S130.

In step S130, the ECU 22 calculates the output torque characteristic Tp from the output torque characteristic map M1 based on the acquired atmospheric pressure P, and sets the calculated output torque characteristic Tp as the output torque characteristic of the engine under the atmospheric pressure P. At the same time, the ECU 22 calculates the maximum torque engine speed Np from the calculated output torque characteristic Tp and proceeds to step S140.

In step S140, the ECU 22 acquires the target engine speed Nt from the control device 36 and proceeds to step S150.

In step S150, the ECU 22 determines whether the calculated and acquired target engine speed Nt is lower than the maximum torque engine speed Np.

Upon determining that the target engine speed Nt is lower than the maximum torque engine speed Np, the ECU 22 proceeds to step S160.

Upon determining that the target engine speed Nt is not lower than the maximum torque engine speed Np and thus is equal to or higher than the maximum torque engine speed Np, the ECU 22 proceeds to step S260.

In step S160, the ECU 22 determines whether the calculated and acquired target engine speed Nt is a low idle engine speed Nlow.

Upon determining that the target engine speed Nt is the low idle engine speed Nlow, the ECU 22 proceeds to step S170.

Upon determining that the target engine speed Nt is not the low idle engine speed Nlow, the ECU 22 proceeds to step S370.

In step S170, the ECU 22 selects the isochronous control for controlling the engine 19, and returns to step S110.

In step S260, the ECU 22 selects the isochronous control for controlling the engine 19, and returns to step S110.

In step S370, the ECU 22 selects the droop control for controlling the engine 19, and returns to step S110.

Next, as illustrated in FIG. 5, in step S410, the control device 36 acquires the operation signal from the accelerator 18 indicating the accelerator position Sn and proceeds to step S420.

In step S420, the control device 36 calculates the target engine speed Nt of the engine 19 from the acquired accelerator position Sn, and proceeds to step S430.

In step S430, the control device 36 acquires the actual engine speed N from the ECU 22 and proceeds to step S440.

In step S440, the control device 36 calculates the control target engine speed Nc from the control target engine speed map M4 based on the calculated target engine speed Nt, and proceeds to step S450.

In step S450, the control device 36 calculates the difference ΔN (Nc−N) from the acquired actual engine speed N and the calculated control target engine speed Nc, and proceeds to step S460.

In step S460, the control device 36 determines whether the calculated difference ΔN is larger than calculated 0.

Upon determining that the difference ΔN is larger than 0, the control device 36 proceeds to step S470.

Upon determining that the difference ΔN is not larger than 0 and thus is smaller than 0, the control device 36 proceeds to step S570.

In step S470, the control device 36 performs control in such a manner that the pressure servo valve 34 is switched to the position 34Y with the electromagnetic proportional pressure reducing valve 35, so that the discharge amount of the hydraulic pump 29 is decreased, and returns to step S410.

In step S570, the control device 36 performs control in such a manner that the pressure servo valve 34 is switched to the position 34X with the electromagnetic proportional pressure reducing valve 35, so that the discharge amount of the hydraulic pump 29 is increased, and returns to step S410.

Figure 6:
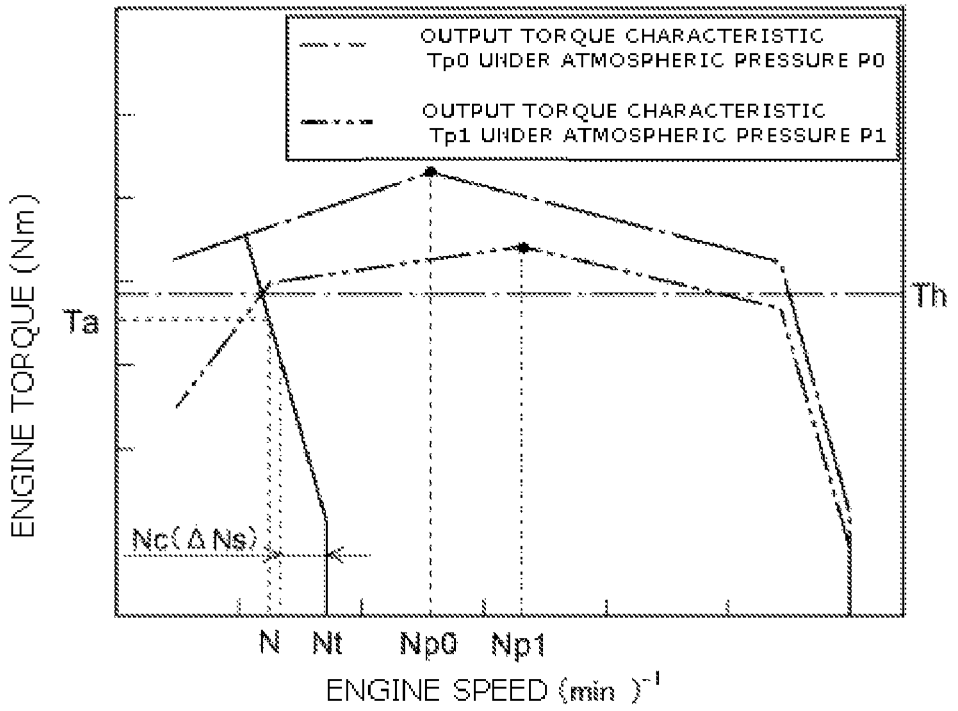
FIG. 6 is a graph illustrating a mode of droop control for the engine of the construction machine according to another embodiment of the present invention.
Figure 7:
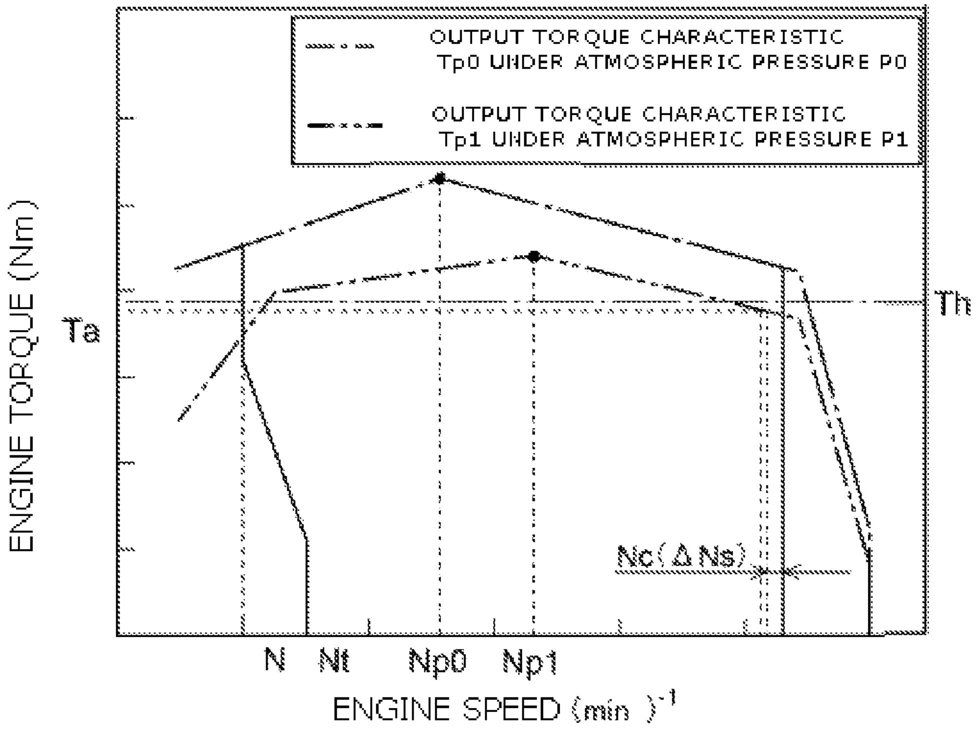
FIG. 7 is a graph illustrating a mode of isochronous control for the engine of the construction machine according to another embodiment of the present invention.

For example, as illustrated in FIGS. 6 and 7, the ECU 22 sets an output torque characteristic Tp1, calculated from the output torque characteristic map M1 based on the atmospheric pressure P1, as the output torque characteristic.

As illustrated in FIG. 6, the ECU 22 selects the droop control for controlling the engine 19 when the target engine speed Nt is smaller than the maximum torque engine speed Np1. The control device 36 gently reduces the actual engine speed N of the engine 19 as a load torque (absorption torque of the hydraulic pump 29) increases, through the droop control. When the difference ΔN becomes larger than 0, the control device 36 performs the control in such a manner that the pressure servo valve 34 is switched to the position 34Y with the electromagnetic proportional pressure reducing valve 35, so that the discharge amount of the hydraulic pump 29 is reduced. More specifically, the control device 36 controls the electromagnetic proportional pressure reducing valve 35 in such a manner that an absorption torque Th of the hydraulic pump 29 becomes smaller than a current output torque Ta of the engine 19. The control target engine speed Nc is set to a level at which the ECU 22 can perform the droop control for the engine 19.

As illustrated in FIG. 7, the ECU 22 selects the isochronous control for controlling the engine 19 when the target engine speed Nt is equal to or higher than the maximum torque engine speed Np1. The control device 36 increases the output torque of the engine 19 as the load torque increases, through the isochronous control. When the output torque of the engine 19 reaches the maximum torque with the target engine speed Nt, the ECU 22 reduces the actual engine speed N and increases the output torque. When the difference ΔN becomes larger than 0 due to the reduction in the actual engine speed N, the control device 36 performs control in such a manner that the pressure servo valve 34 is switched to the position 34X with the electromagnetic proportional pressure reducing valve 35 in such a manner that the absorption torque Th of the hydraulic pump 29 becomes smaller than the current output torque Tb of the engine 19. The control target engine speed Nc is set to be larger than that in the case of the droop control because the ECU 22 is performing the isochronous control for the engine 19.

Even when the target engine speed Nt is lower than the maximum torque engine speed Np1, the ECU 22 selects the isochronous control for controlling the engine 19 if the actual engine speed N reaches the low idle engine speed Nlow. Thus, when the mode for controlling the engine 19 is switched to the isochronous control, the control device 36 controls the swash plate angle of the hydraulic pump 29 by switching the control target engine speed Nc to the control target engine speed Nc corresponding to the isochronous control with the low idle engine speed Nlow.

In the backhoe 1 having the configuration described above, the actual engine speed N of the engine 19 is gently reduced based on the droop characteristic as the load torque increases when the target engine speed Nt of the engine 19 is lower than the maximum torque engine speed Np1. Thus, the backhoe 1 controls the flowrate control actuator 33 in such a manner that the difference ΔN becomes larger than 0 and the discharge amount (absorption torque) of the hydraulic pump 29 reduces before the output torque of the engine 19 exceeds the maximum torque with the actual engine speed N.

Thus, when the target engine speed Nt of the engine 19 is lower than the maximum torque engine speed Np, the backhoe 1 controls the discharge amount of the hydraulic pump 29 in addition to the droop control for the engine 19, whereby the actual engine speed N of the engine 19 can be prevented from abruptly changing. Thus, the backhoe 1 selects the mode for controlling the engine 19 in accordance with the task, and can prevent hunting of the engine speed of the engine 19 caused by an interference between the control for the engine 19 by the ECU 22 and the control for the hydraulic pump 29 by the control device 36.

The backhoe 1 calculates the control target engine speed Nc to be larger in the case where the isochronous control is performed for controlling the engine 19 than in the case where the droop control is performed. The isochronous control is employed when the target engine speed Nt of the engine 19 is the low idle engine speed. Thus, in the backhoe 1, the discharge amount of the hydraulic pump 29 is controlled in accordance with the mode for controlling the engine 19. Thus, in the backhoe 1, the control for the engine 19 by the ECU 22 and the control for the hydraulic pump 29 by the control device 36 are balanced, whereby the engine output is effectively used, and a stall of the engine can be prevented.

In the backhoe 1, when the target engine speed Nt is equal to or higher than the maximum torque engine speed Np, the ECU 22, upon acquiring a signal indicating that a crane travel mode is selected from the control device 36, changes the target engine speed Nt of the engine to an engine speed lower than the maximum torque engine speed Np. Thus, the ECU 22 selects the droop control for controlling the engine 19 and reduces the target engine speed Nt of the engine to achieve a suspending travelling speed with which the crane operation can be performed. Thus, the backhoe 1 needs not to have a circuit element for reducing the actual engine speed N of the engine 19, an input/output port, a switch for reducing the travelling speed of the backhoe 1, and the like.

Next, the modes for controlling the engine 19 and the hydraulic pump 29 of the backhoe 1 according to the present invention are described in detail with reference to FIGS. 6 to 8. In an embodiment described below, the points that are the same as those in the embodiment described above are not described in detail, and different points are mainly described.

The control device 36 controls the discharge amount of the hydraulic pump 29 with the flowrate adjustment device 32. The control device 36 stores various programs for controlling the electromagnetic proportional pressure reducing valve 35 based on the target engine speed map M3 for calculating the target engine speed Nt based on the accelerator position Sn, a reference difference map M4A for calculating a reference difference ΔNs based on the calculated target engine speed Nt, and a difference ΔN1 (Nt−N) between the actual engine speed N and the target engine speed Nt. The target engine speed Nt is an engine speed to be maintained by the engine 19 in accordance with the accelerator position Sn. The reference difference ΔNs is a difference between the target engine speed Nt, serving as a reference for starting the control for changing the discharge amount of the hydraulic pump 29, and the actual engine speed N.

The control device 36 can calculate the reference difference ΔNs from the reference difference map M4A based on the calculated target engine speed Nt.

More specifically, the control device 36 calculates different reference differences ΔNs based on the target engine speeds Nt of the engine 19. The reference difference ΔNs calculated by the control device 36 is smaller in a case where the target engine speed Nt is equal to or higher than the maximum torque engine speed Np than in a case where the target engine speed Nt is lower than the maximum torque engine speed Np. In other words, the reference difference ΔNs calculated by the control device 36 is smaller in a case where the isochronous control is performed by the engine 19 than in a case where the droop control is performed.

Modes for controlling the engine 19 and the hydraulic pump 29 of the backhoe 1 having the configuration described above are described below.

The control device 36 calculates the reference difference ΔNs from the reference difference map M4A based on the calculated target engine speed Nt. Then, the control device 36 calculates the difference ΔN1 (=Nt−N) from the actual engine speed N of the engine 19 acquired from the ECU 22 and the calculated target engine speed Nt, and compares the difference ΔN1 with the reference difference ΔNs.

When the difference ΔN1 is equal to or larger than the reference difference ΔNs, the control device 36 performs control in such a manner that the pressure servo valve 34 is switched to the position 34Y with the electromagnetic proportional pressure reducing valve 35. As a result, the flowrate control actuator 33 changes the angle of the movable swash plate 29*a* of the hydraulic pump 29 in such a manner that the discharge amount (absorption torque) of the hydraulic pump 29 decreases. When the difference ΔN1 is smaller than the reference difference ΔNs, the control device 36 performs control in such a manner that the pressure servo valve 34 is switched to the position 34X with the electromagnetic proportional pressure reducing valve 35. As a result, the flowrate control actuator 33 changes the angle of the movable swash plate 29*a* of the hydraulic pump 29 in such a manner that the discharge amount (absorption torque) of the hydraulic pump 29 increases.

Modes for controlling the engine 19 and the hydraulic pump 29 by the ECU 22 and the control device 36 are described in detail with reference to FIG. 8.

Figure 8:
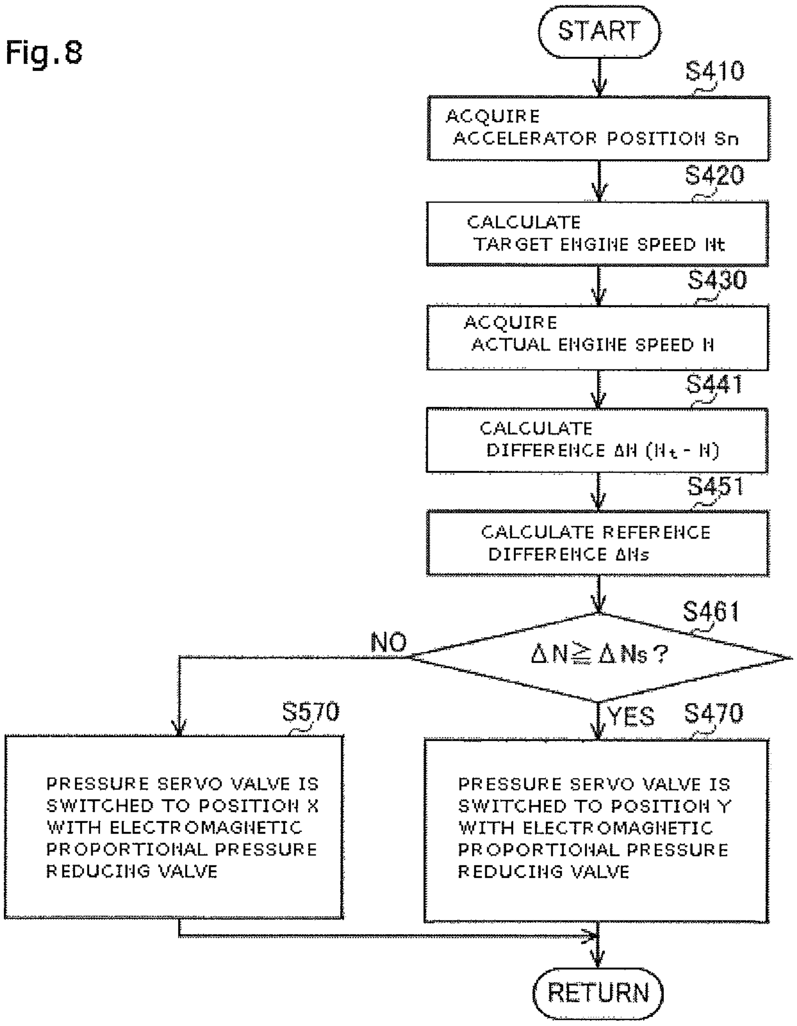
FIG. 8 is a flowchart illustrating another embodiment of the mode for controlling the hydraulic pump of the construction machine according to one embodiment of the present invention.

As illustrated in FIG. 8, in step S441, the control device 36 calculates the difference ΔN1 from the calculated target engine speed Nt and the acquired actual engine speed N, and proceeds to step S451.

In step S451, the control device 36 calculates the reference difference ΔNs from the reference difference map M4 based on the calculated target engine speed Nt, and proceeds to step S461.

In step S461, the control device 36 determines whether the calculated difference ΔN1 is equal to or larger than the calculated reference difference ΔNs.

Upon determining that the difference ΔN1 is equal to or larger than the reference difference ΔNs, the control device 36 proceeds to step S470.

Upon determining that the difference ΔN1 is not equal to or larger than the reference difference ΔNs and thus is smaller than the reference difference ΔNs, the control device 36 proceeds to step S570.

As illustrated in FIG. 6, when the difference ΔN1 becomes equal to or larger than the reference difference ΔNs, the control device 36 performs the control in such a manner that the pressure servo valve 34 is switched to the position 34Y with the electromagnetic proportional pressure reducing valve 35, so that the discharge amount of the hydraulic pump 29 is reduced. More specifically, the control device 36 controls the electromagnetic proportional pressure reducing valve 35 in such a manner that the absorption torque Th of the hydraulic pump 29 becomes smaller than the current output torque Ta of the engine 19. The reference difference ΔNs is set to a level at which the ECU 22 can perform the droop control for the engine 19.

As illustrated in FIG. 7, when the difference ΔN1 becomes equal to or larger than the reference difference ΔNs due to the reduction in the actual engine speed N, the control device 36 performs control in such a manner that the pressure servo valve 34 is switched to the position 34Y with the electromagnetic proportional pressure reducing valve 35 in such a manner that the absorption torque Th of the hydraulic pump 29 becomes smaller than the current output torque Tb of the engine 19. The reference difference ΔNs is set to be smaller than that in the case of the droop control because the ECU 22 is performing the isochronous control for the engine 19.

When the mode for controlling the engine 19 is switched to the isochronous control, the control device 36 controls the swash plate angle of the hydraulic pump 29 by switching the reference difference ΔNs to the reference difference ΔNs corresponding to the isochronous control with the low idle engine speed Nlow.

In the backhoe 1 having the configuration described above, the backhoe 1 controls the flowrate control actuator 33 in such a manner that the difference ΔN1 becomes larger than the reference difference ΔNs and the discharge amount (absorption torque) of the hydraulic pump 29 reduces before the output torque of the engine 19 exceeds the maximum torque with the actual engine speed N. The backhoe 1 calculates the reference difference ΔNs to be smaller in the case where the isochronous control is performed for controlling the engine 19 than in the case where the droop control is performed.

INDUSTRIAL APPLICABILITY

The present invention is applicable to a technique for a construction machine equipped with an engine such as a backhoe or the like.

REFERENCE SIGNS LIST

1 Backhoe
19 Engine
20 Hydraulic pump
Sn Accelerator position
N Actual engine speed
Nt Target engine speed
ΔN Difference
Np Maximum torque engine speed

The invention claimed is:

1. A construction machine controlling a swash plate angle of a variable capacity hydraulic pump driven by an engine based on a difference between an actual engine speed of the engine and a target engine speed calculated from an accelerator position, wherein the engine is controlled through isochronous control when the target engine speed calculated from an accelerator position is equal to or higher than a maximum torque engine speed calculated by an engine control unit with which a maximum torque of the engine is able to be output, and the engine is controlled through droop control when the target engine speed calculated from an accelerator position is lower than the maximum torque engine speed with which the maximum torque of the engine is able to be output.

2. The construction machine according to claim 1, wherein a control target engine speed at which control for the swash plate angle of the hydraulic pump starts when the engine is controlled through the isochronous control and a control target engine speed at which control for the swash plate angle of the hydraulic pump starts when the engine is controlled through the droop control are set to be different values.

3. The construction machine according to claim 1, wherein the engine is controlled through the isochronous control when the actual engine speed of the engine reaches a low idle engine speed of the engine.

4. The construction machine according to claim 2, wherein the engine is controlled through the isochronous control when the actual engine speed of the engine reaches a low idle engine speed of the engine.

* * * * *